United States Patent
Jenne et al.

(10) Patent No.: US 9,870,037 B2
(45) Date of Patent: Jan. 16, 2018

(54) METHOD AND APPARATUS FOR COLLABORATIVE POWER AND THERMAL CONTROL OF FAN RUN TIME AVERAGE POWER LIMITING

(71) Applicant: DELL PRODUCTS, L.P., Round Rock, TX (US)

(72) Inventors: John Erven Jenne, Austin, TX (US); Dominick Adam Lovicott, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 323 days.

(21) Appl. No.: 14/675,910

(22) Filed: Apr. 1, 2015

(65) Prior Publication Data

US 2016/0291656 A1    Oct. 6, 2016

(51) Int. Cl.
| | | |
|---|---|---|
| G06F 1/26 | (2006.01) | |
| G06F 1/20 | (2006.01) | |
| G05B 15/02 | (2006.01) | |

(52) U.S. Cl.
CPC .............. *G06F 1/26* (2013.01); *G05B 15/02* (2013.01); *G06F 1/206* (2013.01); *Y02B 60/1275* (2013.01)

(58) Field of Classification Search
CPC ............ G06F 1/26; G06F 1/206; G05B 15/02
USPC ........................................................ 700/300
See application file for complete search history.

(56) References Cited

U.S. PATENT DOCUMENTS

| | | | |
|---|---|---|---|
| 7,337,018 B2 | 2/2008 | Espinoza-Ibarra et al. | |
| 8,914,157 B2 | 12/2014 | Li et al. | |
| 2004/0257013 A1* | 12/2004 | Chhleda | G06F 1/206 318/268 |
| 2005/0024828 A1 | 2/2005 | Espinoza-Ibarra et al. | |
| 2005/0138440 A1* | 6/2005 | Barr | G06F 1/206 713/300 |
| 2006/0016901 A1* | 1/2006 | Beitelmal | H05K 7/20209 236/49.3 |
| 2007/0067136 A1* | 3/2007 | Conroy | G06F 1/206 702/130 |
| 2007/0245161 A1* | 10/2007 | Shaw | G06F 1/3203 713/300 |
| 2008/0186674 A1* | 8/2008 | Muraki | G06F 1/206 361/695 |
| 2008/0301475 A1* | 12/2008 | Felter | G06F 1/3203 713/300 |
| 2009/0167228 A1* | 7/2009 | Chung | G05D 23/1917 318/455 |
| 2011/0055596 A1* | 3/2011 | Wyatt | G06F 1/206 713/300 |
| 2011/0257802 A1* | 10/2011 | Bieswanger | G06F 1/20 700/291 |
| 2012/0049922 A1 | 3/2012 | Tanaka et al. | |

(Continued)

*Primary Examiner* — Vincent Tran
(74) *Attorney, Agent, or Firm* — Isidore PLLC

(57) ABSTRACT

A method for allocating power within an information handling system (IHS) includes: monitoring power consumed by components within the IHS; monitoring thermal state of the components; evaluating power demand and cooling demand for each of the components; and adjusting power allocated to at least one of a computing resource and system cooling according to results of the evaluating. An information handling system (IHS) and a controller that both perform similar processes are disclosed.

18 Claims, 6 Drawing Sheets

(56) References Cited

U.S. PATENT DOCUMENTS

| | | | |
|---|---|---|---|
| 2012/0084551 A1* | 4/2012 | Cheng | G06F 1/206 713/2 |
| 2012/0137158 A1* | 5/2012 | Nelluri | G06F 1/3203 713/340 |
| 2013/0098599 A1* | 4/2013 | Busch | H05K 7/20209 165/294 |
| 2013/0195676 A1* | 8/2013 | Luo | H05K 7/20209 417/44.1 |
| 2013/0242504 A1* | 9/2013 | Cartes | G05D 23/1931 361/679.49 |
| 2014/0067139 A1 | 3/2014 | Berke et al. | |
| 2014/0068311 A1 | 3/2014 | Jenne | |
| 2014/0089688 A1 | 3/2014 | Man et al. | |
| 2014/0190681 A1* | 7/2014 | Chainer | H05K 7/20836 165/289 |
| 2014/0231061 A1* | 8/2014 | Barringer | H05K 7/20736 165/279 |
| 2014/0277818 A1* | 9/2014 | Peterson | G06F 1/206 700/300 |
| 2014/0351621 A1* | 11/2014 | Conroy | G06F 1/26 713/340 |
| 2015/0082811 A1* | 3/2015 | Rangarajan | F25B 21/02 62/3.7 |
| 2015/0177814 A1* | 6/2015 | Bailey | G06F 1/3234 713/320 |
| 2016/0054779 A1* | 2/2016 | Bodas | G06F 1/3203 700/291 |
| 2016/0102880 A1* | 4/2016 | Lovicott | F24F 11/008 700/300 |
| 2016/0179164 A1* | 6/2016 | Park | G06F 1/324 713/322 |

\* cited by examiner

METHOD AND APPARATUS FOR COLLABORATIVE POWER AND THERMAL CONTROL OF FAN RUN TIME AVERAGE POWER LIMITING

BACKGROUND

1. Technical Field

The present disclosure generally relates to an information handling system and in particular to power management for cooling systems within an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

New generations of information handling systems have required increases in power capabilities over prior generations. Seemingly without exception, new designs have increased components such as central processing units (CPU), hard disk drives (HDD), memory, various adapters and controllers, all of which generate heat. As each generation has an increased thermal load, effective management of cooling systems is of increasing importance.

The "thermal design power (TDP)" for a given component represents a maximum amount of heat a cooling system is required to dissipate. That is, if a cooling system is capable of dissipating the TDP rated heat for a given component, the component will operate as intended. In short, the TDP is the power budget under which the various components must operate. However, the TDP is not the maximum power a component can consume. For example, it is possible for a processor to consume more than the TDP power for a short period of time without it being "thermally significant." Using basic physics, heat will take some time to propagate, so a short burst may not jeopardize the goal of staying within the TDP.

Various techniques have been employed to manage thermal control in view of system performance. Exemplary techniques have included use of oversized cooling systems, controlling processor speed as a function of temperature, and implementing power capping (i.e., limiting the power to heat generating components). Unfortunately, the various techniques for thermal control can impact system performance. In some instances, the impact is merely nominal. However, this is not always the case.

Unfortunately, power within an information handling system is not limitless and use of system power is not without thermal and performance consequence. Clearly, as a motorized component, the fan can consume a substantial amount of power. In systems that increasingly demand power for computing resources, having power dedicated to the cooling system can substantially impact performance.

That is, while thermal control techniques may limit power to multiple subsystems, such techniques do not account for limiting power to a system fan for controlling power consumption by the fan. Accordingly, design of information handling systems must take into account balance of system performance with thermal control.

What is needed is a solution to provide dynamic run-time bi-directional communication that serves the needs of both power control and thermal control where priority there between may fluctuate.

BRIEF SUMMARY

In one embodiment, a computer-implemented method for allocating power within an information handling system (IHS) is provided. The method includes monitoring power consumed by components within the IHS; monitoring thermal state of the components; evaluating power demand and cooling demand for each of the components; and adjusting power allocated to at least one of a computing resource and system cooling according to results of the evaluating.

The adjusting of power allocation may include setting a power cap for at least one of the computing resource and the system cooling. Adjusting may compensate for lost cooling capacity by implementing subsystem-level power capping. Adjusting may include dynamically limiting the power to an allocated limit. Monitoring the thermal state may include monitoring one of an actual thermal state and a projected thermal state. Adjusting power to the system cooling may be performed in response to a thermal state of the at least one computing resource. Adjusting may be performed according to a performance characterization. Evaluating may be limited to the most limiting components that constrain power allocated to the system cooling. The cooling system may include a plurality of zones and the adjusting may be performed individually for each zone.

In another embodiment, an information handling system (IHS) is provided. The information handling system (IHS) includes: a plurality of computing resources configured for providing computing functions; system cooling configured for cooling the plurality of computing resources; and a controller that monitors power consumed by the computing resources and the system cooling and monitors the thermal state of the computing resources; The controller evaluates power demand and cooling demand for each of the components and adjusts power allocated to at least one of a computing resource and system cooling according to results of the evaluating.

The plurality of computing resources may include at least one of one or more processors, memory, storage, an input/output controller, a baseboard management controller (BMC), and a sensor. The system cooling may include at least one fan. The controller may include a node manager. The controller may be configured to adjust the power by pulse width modulation (PWM). At least one of the processes of monitoring power, monitoring the thermal state, and adjusting may be performed by implementing a messaging protocol. The messaging protocol may include one of Intelligent Platform Management Interface (IPMI) and Datacenter Manageability Interface (DCMI). Further, the messaging protocol may include one or more commands for implementing at least one of: obtaining a power range for the cooling system; obtaining a rate of change for the cooling system; obtaining power allocated to the cooling system; setting a power limit for the cooling system; obtaining a performance limit for the cooling system; and receiving notification of a change in a power range for the cooling system.

In yet another embodiment, a controller for an information handling system (IHS) is provided. The controller includes a set of machine executable instructions stored on non-transitory machine readable media, including instructions for: monitoring power consumed by at least one computing resource and system cooling; monitoring the thermal state of the at least one computing resource; evaluating power demand for the at least one computing resource and the system cooling as well as cooling demand for the at least one computing resource; and adjusting power allocated to at least one of the at least one computing resource and to the system cooling according to results of the evaluating. The non-transitory machine readable media may include at least one of software and firmware. The controller may include a microprocessor.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide an information handling system (IHS) and a method performed within the information handling system for a dynamic run-time bi-directional communication that provides for power control and thermal control.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
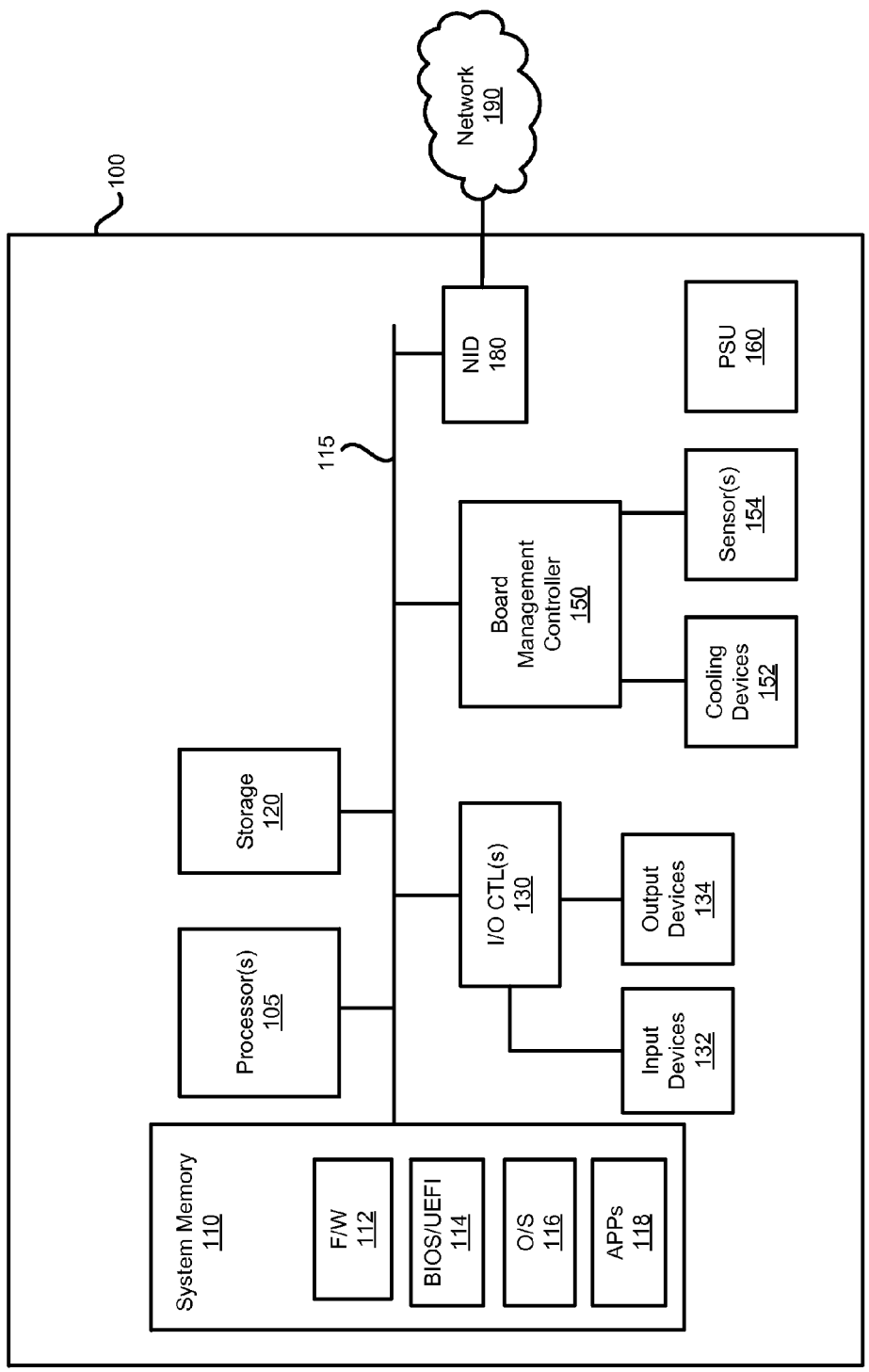
FIG. 1 illustrates an example information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 105 coupled to system memory 110 via system interconnect 115. The one or more processor(s) 105 may also be referred to as a "central processing unit (CPU) 105." System interconnect 115 can be interchangeably referred to as a "system bus 115," in one or more embodiments. Also coupled to system interconnect 115 is storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 110 during operation of IHS 100. As shown, system memory 110 can include therein a plurality of software and/or firmware modules including firmware (F/W) 112, basic input/output system/unified extensible firmware interface (BIOS/UEFI) 114, operating system (O/S) 116 and application(s) 118. The various software and/or firmware modules have varying functionality when their corresponding program code is executed by one or more processors 105 or other processing devices within IHS 100. During boot-up or booting operations of IHS 100, processor 105 selectively loads at least BIOS/UEFI driver or image from non-volatile random access memory (NVRAM) to system memory 110 for storage in BIOS/UEFI 114. In one or more embodiments, BIOS/UEFI image comprises the additional functionality associated with unified extensible firmware interface and can include UEFI images and drivers.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output device(s) 134, such as a monitor or display device or audio speaker(s).

IHS 100 further implements a baseboard management controller (BMC) 150. The BMC 150 is in communication with and control of one or more cooling device 152, and at least one sensor 154. At least one power supply unit 160 is included in the IHS 100.

A power controller 170 is included in the IHS 100. The power controller 170 allows data center managers to monitor server power and thermal behavior in real time. Using this technology, it is possible to set upper limits on power used by a server and thus to maximize the rack density with confidence that rack power budgets will not be exceeded. During a power or thermal emergency, the power controller 170 can automatically limit power consumption and extend service uptime from stand-by power sources. Server power and thermal information may be used to improve efficiency by moving workloads, extending the life of stand-by power resources, and by other similar techniques.

The thermal controller 175 is included in the IHS 100. The thermal controller 175 may be configured to cap power allocated to components within the IHS 100. Generally, the thermal controller 175 maintains acceptable temperatures for components by at least one of: eliminating additional margin due to temperature offsets for performance or intentional over cooling; allowing short thermal excursions beyond long term reliability temperature limits, while maintaining components within maximums; and applying policies for capping power.

IHS 100 further includes a network interface device (NID) 180. NID 180 enables IHS 100 to communicate and/or interface with other devices, services, and components that are located external to IHS 100. These devices, services, and components can interface with IHS 100 via an external network, such as exemplary network 190, using one or more communication protocols. In one embodiment, a customer provisioned system/platform can comprises multiple devices located across a distributed network, and NID 180 enables IHS 100 to be connected to these other devices. Network 190 can be a local area network, wide area network, personal area network, and the like, and the connection to and/or between network and IHS 100 can be wired or wireless or a combination thereof. For purposes of discussion, network 190 is indicated as a single collective component for simplicity. However, it is appreciated that network 190 can include one or more direct connections to other devices as well as a more complex set of interconnections as can exist within a wide area network, such as the Internet.

As discussed herein, and for purposes of clarity, the IHS 100 includes a plurality of "computing resources" and system cooling. Generally, the computing resources provide system functionality needed for computing functions. Exemplary computing resources include, without limitation, processor(s) 105, system memory 110, storage 120, and the input/output controller(s) 130, and other such components. Generally, the system cooling components provide for cooling of the computing resources. Exemplary system cooling components include the one or more cooling devices 152, and may include at least one fan.

In order to provide further context for the teachings disclosed herein, some definitions are now introduced.

As discussed herein, the term "thermal design power (TDP)" generally refers to a maximum amount of power that a cooling system is required to dissipate.

As discussed herein, the term "run-time average power limiting" (which may also be referred to as "running average power limit," "RAPL" and by other similar terms), generally refers to a technique for limiting power consumption within components such as the one or more processor(s) 105 and the system memory 110. RAPL, which may be implemented in software (such as through a messaging protocol), provides for monitoring power consumption of a particular component and enforcing a power limit to a set power and/or cooling budget. Because multiple bursts of heavy workloads will eventually cause average power or component temperature to rise, use of a uniform power limit is not effective. By dynamically monitoring power consumption, RAPL provides for more effective monitoring and limiting of power consumption (and therefore, heat generation). By making use of RAPL, designers can set short-term and longer-term power limits in order to limit the power and thermal load.

As discussed herein, the term "messaging protocol" generally refers to a set of computer interface specifications for control and management of computer subsystems. A particular messaging protocol will define a set of interfaces for managing disparate components within a computing system. Generally, a messaging protocol will operate independently of an operating system (OS). One example of a messaging protocol is the Intelligent Platform Management Interface (IPMI) defined by Intel Corporation of Santa Clara, Calif. (Intel Corporation is also referred to elsewhere herein simply as "Intel").

As discussed herein, the term "software" generally refers to a set of machine executable instructions stored on a machine readable media. The machine readable media may be considered "non-transitory." The software may be used to implement varying methods, some embodiments of which are described herein. Software may also be referred to by other common terminology such as a "program" that includes "program code". The non-transitory machine readable media may include any form of media deemed appropriate. For example, the non-transitory machine readable media may include magnetic media, optical media, and other forms of media. The program code may be implemented in read only memory (ROM), such as in firmware, or in other portions of a given computer system.

As discussed herein, the term "fan" generally refers to a cooling device 152 that is a power consuming device used for cooling a computing system. In the exemplary embodiment, the fan is a conventional motorized fan for improving airflow in a computing system. The fan is not limited to implementation as one motorized device, nor as a conventional fan, and may include additional devices (such as implemented in a liquid cooling system). Other components as may be used for cooling the computing system and that consume power to achieve the intended effect are considered as included in the descriptions referring to the term "fan". Generally, as discussed herein, the fan includes a conventional power supply (such as power supply unit 160), controller, motor and other components necessary for dissipation of heat from an information handling system (IHS) 100. Generally, in the exemplary embodiments discussed herein, the fan is powered by a power supply, such as a direct current (DC) power supply. The power provided to the fan may be provided in a pulsed manner. Accordingly, regulating pulses of power to the fan may include pulse width modulation (PWM), however, other forms of power limiting may be used. In short, the term "fan" may be considered synonymous with a cooling system that consumes power and provides for cooling of a computing system such as the information handling system (IHS) 100.

As discussed herein, a "P-state" is an operational state, meaning that the processor 105 can be doing useful work (in any P-state).

Figure 2:
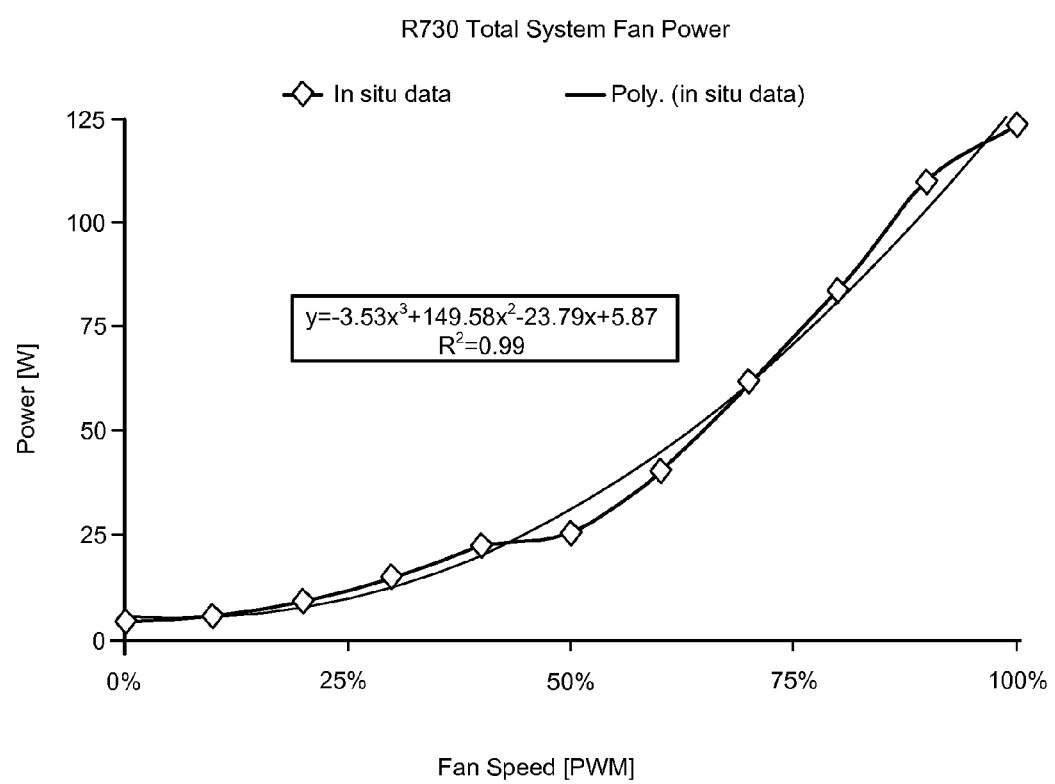
FIG. 2 is a graph presenting an exemplary relationship of fan speed and fan power.

FIG. 2 is a graph that illustrates fan speed as a function of power for an exemplary fan. The graph provided in FIG. 2 includes actual data as well as a cubic relationship that has been fit to the data. As may be seen with reference to the graph, at higher fan speeds, there exists a significant increase in demand for power to the fan.

The solution disclosed herein provides for coordination between a power control loop and a thermal control loop to manage fan speeds, control fan power consumption, and allocate power to computing resources in order to maintain performance of the information handling system (IHS) 100 while maintaining adequate cooling. In at least some of the exemplary embodiments discussed herein, the computing resources include the one or more processor(s) 105 and the system memory 110. Other components may be included in the computing resources. For example, the computing resources may include storage 120. In short, implementation of the teachings herein provide for, among other things, dynamic re-allocation of power to computing resources that provide for functionality of the information handling system (IHS) 100.

In the exemplary embodiments disclosed herein, the thermal control solution enforces a power limit that is dynamically assigned at runtime by a power control solution (for example, a node manager). For purposes of discussion herein, the power limiting feature for limiting power to the fan is referred to as "fan RAPL."

In some embodiments, and by way of example, when a system power cap is active and being enforced, the power control solution may implement reductions in power consumed by the fan, in addition to reductions in power used by the one or more processors 105 and the system memory 110. To compensate for lost airflow, thermal control may implement subsystem-level power capping. Accordingly, the solution provides for minimizing power reduction to the one or more processors 105 and the system memory 110 without compromising system power cap enforcement or system thermal requirements.

Figure 3:
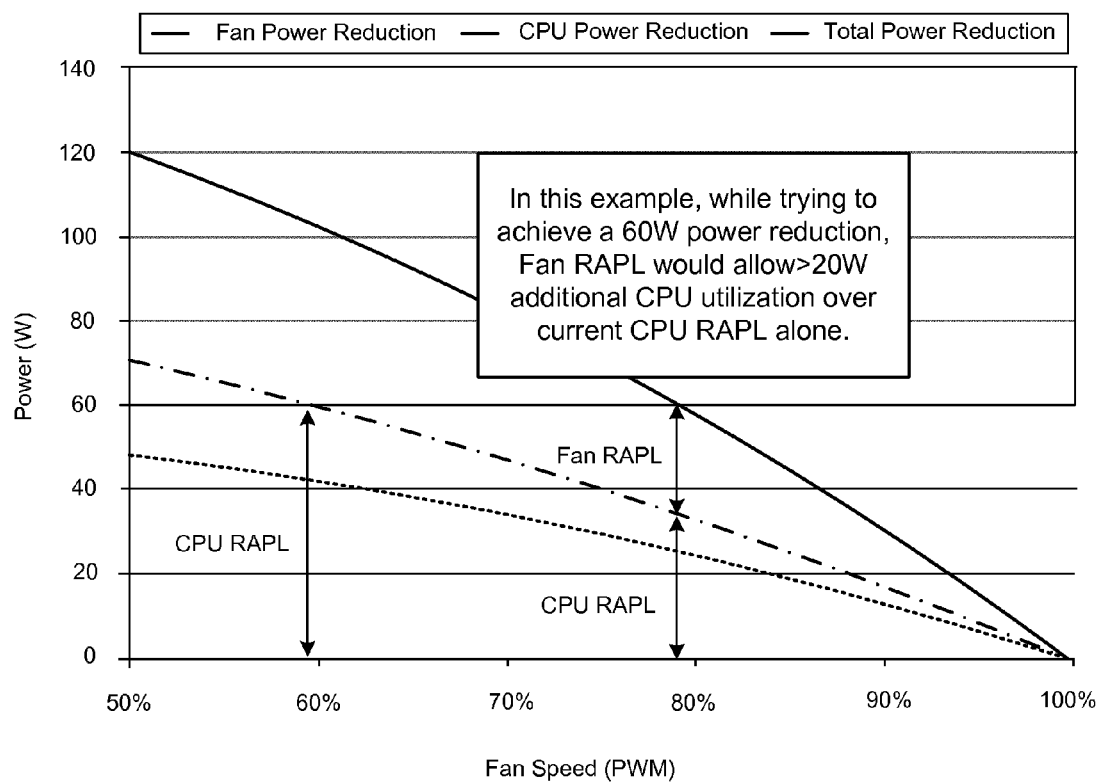
FIG. 3 is a graph presenting an exemplary relationship of fan speed and fan power in relation to average power for a related central processing unit (CPU) within the same information handling system.

Referring now to FIG. 3, aspects of an exemplary embodiment are shown. In this example, power control necessitates a 60 W power reduction for the information handling system (IHS) 100. By implementing fan RAPL, at least 20 W is made available for use by the one or more processors 105 and the system memory 110.

Figure 4:
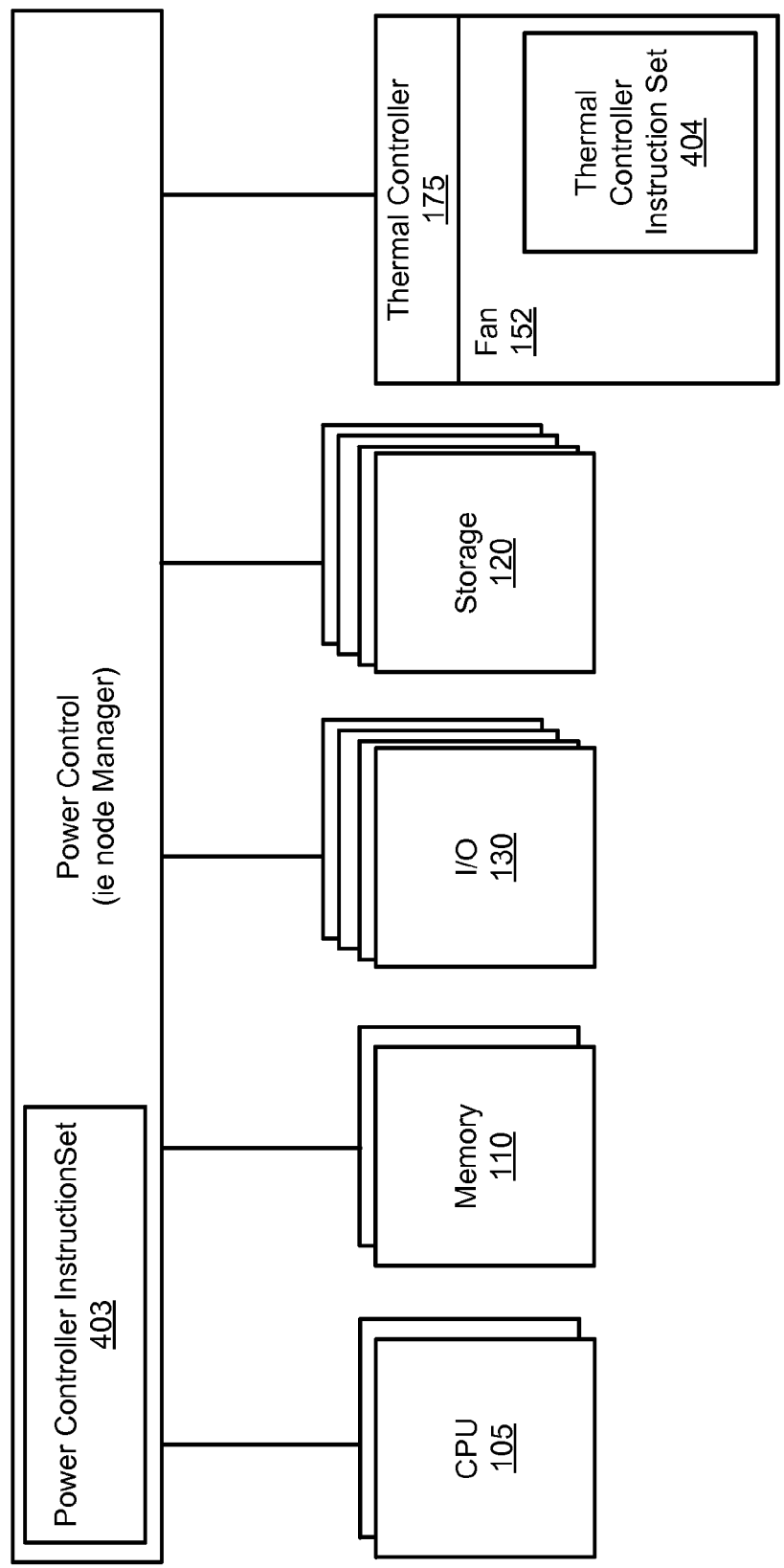
FIG. 4 is a block diagram depicting an exemplary power controller.

Referring now to FIG. 4, aspects of exemplary embodiment for implementation of fan RAPL are shown. In this example, an exemplary power controller 170 is shown. The power controller 170 is in communication with the at least one processor (CPU) 105, system memory 110, the input/output controllers 130, storage 120, and the one or more cooling device(s) 152 through a thermal controller 175. Generally, the power controller 170 and the thermal controller 175 implement a messaging protocol such as at least one of Intelligent Platform Management Interface (IPMI) and Datacenter Manageability Interface (DCMI), or another industry defined standard.

In one embodiment, the power controller 170 includes a node manager such as implementations of node managers from Intel. The Intel Node Manager is a server management technology that allows management software to accurately monitor the platform's power, thermal and compute utilization information and to control the power and thermal behavior through industry defined standards. In some embodiments, the power controller instruction set 403 includes instructions for implementation of the node manager.

In one embodiment, the thermal controller 175 includes the iDRAC available from Dell Computer, Inc. of Austin, Tex. In another embodiment, the thermal controller 175 includes a chassis management controller (CMC) available from Dell Computer. Generally, the thermal controller 175 includes a dedicated processor, memory, network connection, and access to the system bus. Key features include power management, virtual media access and remote console capabilities, all available through a supported web browser or command line interface. This gives system administrators the ability to configure a machine as if the administrator was sitting at the local console (terminal). The iDRAC interfaces with baseboard management controller (BMC) chips based on the Intelligent Platform Management Interface (IPMI) 2.0 standard, which allows use of IPMI out-of-band interfaces such as IPMI over local area network (LAN).

Generally, power controller 170 and the thermal controller 175 contain server management technology that allows management software to accurately monitor and control power and thermal states for the information handling system (IHS) 100. The management software is shown as the power controller instruction set 403 and the thermal controller instruction set 404. The power controller 170 and the thermal controller 175 may be implemented at least partially as software and/or firmware. The power controller 170 and the thermal controller 175 may include other components such as a microprocessor. Generally, the power controller 170 and the thermal controller 175 operate collectively to implement fan RAPL.

Fan RAPL may be described by the following relationship:

Fan RAPL=power control+thermal control.

Fan RAPL dynamically limits the maximum power allocated to the fan. In some embodiments, the recommended default allocation would be the highest power allocation for a given configuration operating at a maximum load and a maximum ambient temperature. The highest power allocation for a given configuration may be considerably less than 100% of the rated power for the fan.

Power control could then dynamically assign power limits for the thermal control in response to system-level power limits. In this embodiment, power control is expressed in thermal terms and with regards to fan power in a simple step-up/step-down algorithm. As each fan may run at a unique fan speed, a logical offset could be used for the power limit instead of the actual fan pulse width modulation (PWM). Power control could continuously monitor system power consumption and dynamically adjust fan RAPL limits accordingly.

Generally, with airflow limited due to implementation of fan RAPL, the thermal controller 175 may maintain acceptable component temperatures by: eliminating any additional margin due to temperature offsets for performance or intentional overcooling for leakage; allowing short thermal excursions beyond long term reliability temperature limits, but within component maximums; and regulating subsystem power as a way to manage system thermal limits by using power cap policies reserved for the thermal control.

In some embodiments, the thermal controller 175 is configured such that fan speeds are never reduced below minimum requirements to reliably cool the information handling system (IHS) 100. That is, the thermal controller 175 may include a reference table expressing minimum and/or maximum temperature ranges for operation. The thermal controller 175 may reference the reference table to establish limits on operation.

In one embodiment, fan RAPL can be achieved by communicating a fan power limit to thermal control. With added intelligence, thermal control uniquely targets power limiting of only the computing resource or computing resources that are constraining power allocated to the fan (that is, the most limiting computing resource). Communication of a fan power limit to the thermal controller 175 may provide for automatic reductions in fan power through normal closed loop temperature control and maximize system throughput.

In another embodiment, power control may dynamically assign fan RAPL power limits in response to system-level power limits. The thermal controller 175 may use a variety of techniques to estimate an appropriate pulse width modulation (PWM) for the fan to enforce the allocated power limit. In embodiments where a plurality of fans are implemented, each fan may run at a unique fan speed. Accordingly, the thermal controller 175 would determine appropriate pulse width modulation (PWM) for each fan to manage the aggregate fan power consumption.

In another embodiment, a current monitor may be placed in the information handling system (HIS) 100. The current monitor (not shown) may be used to monitor power consumption of the fan subsystem. The fan RAPL continuously monitors fan subsystem power consumption and dynamically adjusts power to the fan accordingly. When used in conjunction with the previous embodiment, fan RAPL provides a closed loop solution that intelligently determines the target power needed for the fan to meet the new limit.

In another embodiment, fan RAPL is implemented to emulate a high power device managed by the node manager. As one example, the high power device may include the I/O controller 130. This embodiment would allow seamless integration in to industry standard power control solution.

In another embodiment, some aspects of the foregoing are used and added upon. In this embodiment, a new fan domain is supported in policies for the node manager 170. The new fan domain would extend typical RAPL protocols to support unique aspects of thermal control interaction.

A new policy subsystem domain is provided in the node manager for the fan. Generally, the node manager policies are currently limited to CPU, memory, and High Power I/O subsystem domains. Options for incorporation into system domain policies include user-defined policies. In various embodiments, the system domain policies would not be included in thermal policies as thermal control uses these policies to manage thermal states at a given fan speed. Advantageously, this provides a configuration option to leave out a subsystem domain due to a conflict.

In some embodiments, messaging extensions that may be supported include the following extension.

GetFanPowerRange. The GetFanPowerRange extension will retrieve the power range assigned to the fan. The power range may vary between fan maximum (100% PWM fan power level) or a configuration maximum (which corresponds to a maximum fan speed power level for a given configuration) and a minimum (which corresponds to minimum fan speed power level for a given configuration). In some embodiments, thermal control may use power cap policies instead of fan speed control. Advantageously, the GetFanPowerRange extension accounts for a configuration maximum value.

GetFanChangeRate. The GetFanChangeRate extension indicates the maximum change rate in power or PWM for a defined time period. The GetFanChangeRate returned value could be adjusted by thermal control settings to balance acoustics versus performance. In some embodiments, power control will make use of the value to reduce performance of other components temporarily in order to meet response time requirements. Advantageously, the GetFanChangeRate provides for using a response time that is optimized for balancing acoustics, performance, etc.

GetFanPowerLimit. The GetFanPowerLimit extension provides a standard protocol for reading the current power limit being enforced.

SetFanPowerLimit. The SetFanPowerLimit extension provides a power limit that is within the power range assigned to the fan.

GetFanPerformanceLimit. The GetFanPerformanceLimit extension indicates the fan PWM is actively being limited due to the prevailing fan RAPL power limit. Thermal control would have used more airflow to address thermals but instead may have used thermal power capping policies. Advantageously, by providing an indicator that is not just workload dependent, but also dependent on platform configuration, datacenter environment, or other such considerations, performance may be more precisely controlled. Additionally, the GetFanPerformanceLimit provides for fan throttling or control of the PWM to adjust and precisely control performance.

NotifyFanPowerRangeChange. The NotifyFanPowerRangeChange extension provides for a thermal control alert to power control. The alert may be used to track environmental conditions, platform configuration, or other similar parameters that have changed such that the fan power range has changed. The NotifyFanPowerRangeChange extension provides a communication mechanism for when thermal events take priority over power events. The NotifyFanPowerRangeChange extension may trigger the Node Manager to send a GetFanPowerRange message to get new fan RAPL limits. Except for hot-plug events, the dynamic power range controlled by power control may be static. Advantageously, the NotifyFanPowerRangeChange extension provides for a dynamic power range where the maximum/minimum limits change dynamically.

In yet another embodiment, the fan RAPL could optimize response by assigning different cooling priorities to fan zones. For example, a user may want to ensure performance of a graphics processing unit (GPU) and is willing to trade off performance of the central processing unit (CPU). In this example, power to the CPU fan zone would be reduced more than power to the GPU fan zone.

In yet another embodiment, the fan RAPL could be applied to another usage model where airflow is the controlling variable instead of power. Fan RAPL would enable a customer to define an airflow limit (similar to a power limit) based on the airflow delivered to the system.

Figure 5:
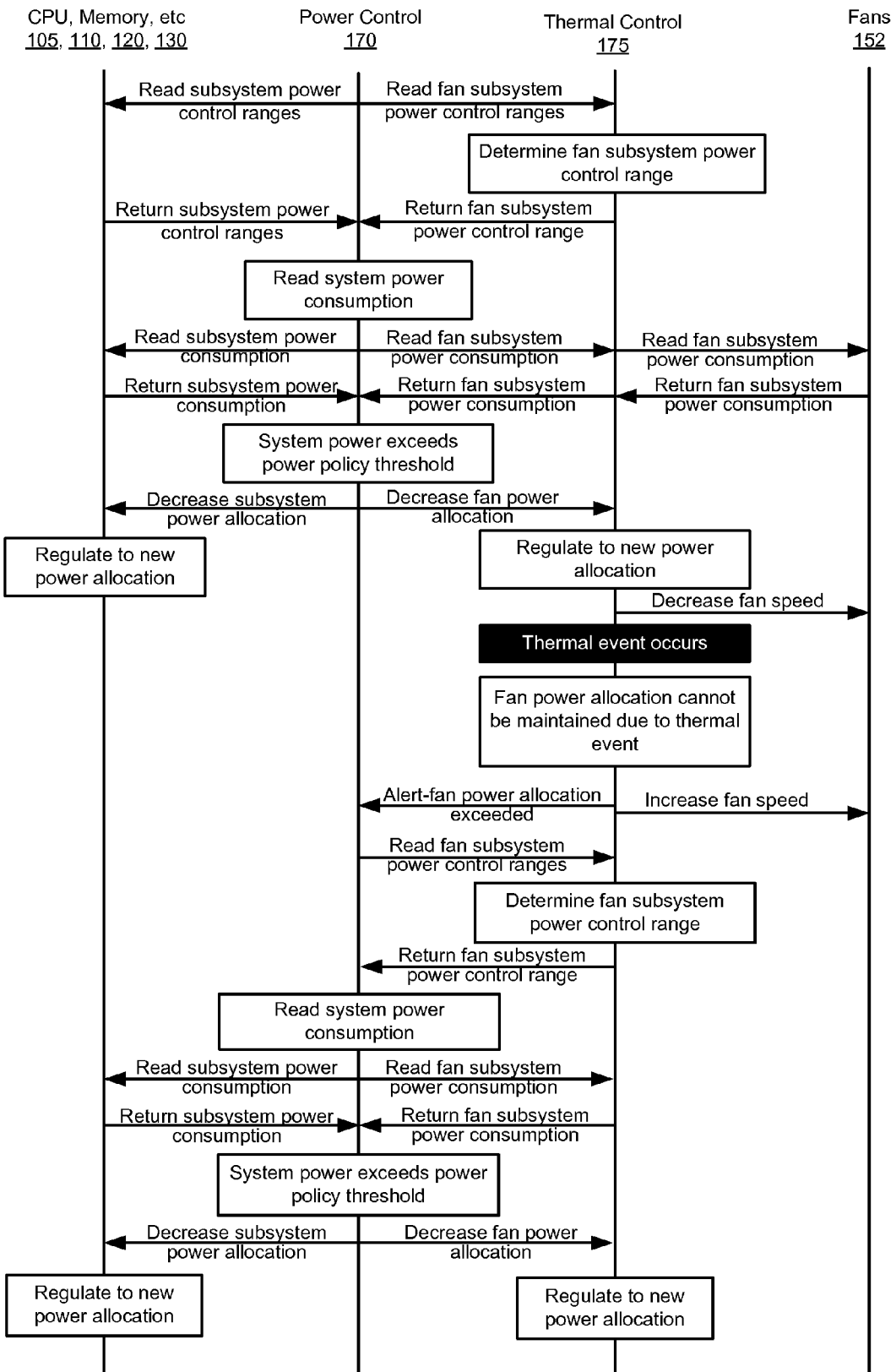
FIG. 5 is a messaging flow diagram depicting aspects of an exemplary messaging sequence for implementation of a dynamic run-time bi-directional communication protocol that provides for power control and thermal control in the exemplary information handling system.

Referring now to FIG. 5, aspects of a communication protocol for fan RAPL are shown. In this illustration, messages are passed between the computing resources (such as processor 105, memory 110, storage 120, and the input/output controller 130), the power controller 170, the thermal controller 175, and the system cooling device 152 (such as a fan). Generally, the messages passed may include those that are a part of the industry defined standard, or may include other messages such as some of the foregoing exemplary messages. The messaging process may continue on an ongoing basis. That is, with reference to FIG. 5, the diagram is to be read from the top down. As may be seen in FIG. 5, the process for power control and thermal control is an ongoing process and is highly repetitive.

FIG. 5 starts with the power controller 170 reading the power range supported from each of the subsystems. For the fan subsystem (the cooling device 152), the power controller 170 gets the power range from the thermal controller 175. The power controller 170 then continues to read the real-time power consumption for the system and each of the subsystems. If the system power exceeds the threshold in an active power cap policy, the power controller 170 will then determine and assign new power allocations for each of the subsystems. New power allocations are assigned by programming new RAPL limits for each subsystem. In this application, the focus is on the power controller 170 assigning a power limit to the fan subsystem. Sub-system RAPL (limits for the CPU 105, memory 110, the cooling device 152, and others) would then regulate the power consumption to the new power allocation. While CPU RAPL adjusts frequency/voltage to reduce power to the processor 105, and memory RAPL adjusts memory throughput and low power state entry to reduce power to the memory 110, the fan RAPL dynamically adjusts fan speed in the cooling device 152.

FIG. 5 continues with a thermal event that can only be handled via increased fan speeds. This event means that the fan RAPL of the thermal controller 175 can no longer be regulated to the power allocations assigned by the power controller 170. The thermal controller 175 alerts the power controller 170 to provide notification that the fan power consumption needs to exceeds the power allocation. The power controller 170 responds by reading the updated power control range for the fan subsystem. Operation continues with power controller 170 re-allocating power to each of the subsystems based on the updated power control for the fan subsystem.

A key aspect of fan RAPL is the dynamic interface between the power control function and the thermal control function. Component power ranges normally never change, so this is a novel aspect of fan RAPL, and a novel interaction between two independent control loops. This provides a closed loop interface between the two control loops where each can provide requests to the other. That is, by applying fan RAPL as disclosed herein, thermal control may request power control to reduce power due to thermal limits, while power control may request thermal control to reduce fan speed due to power limits as appropriate. Aspects of this process are shown at a higher level in the flow chart provided in FIG. 6.

Figure 6:
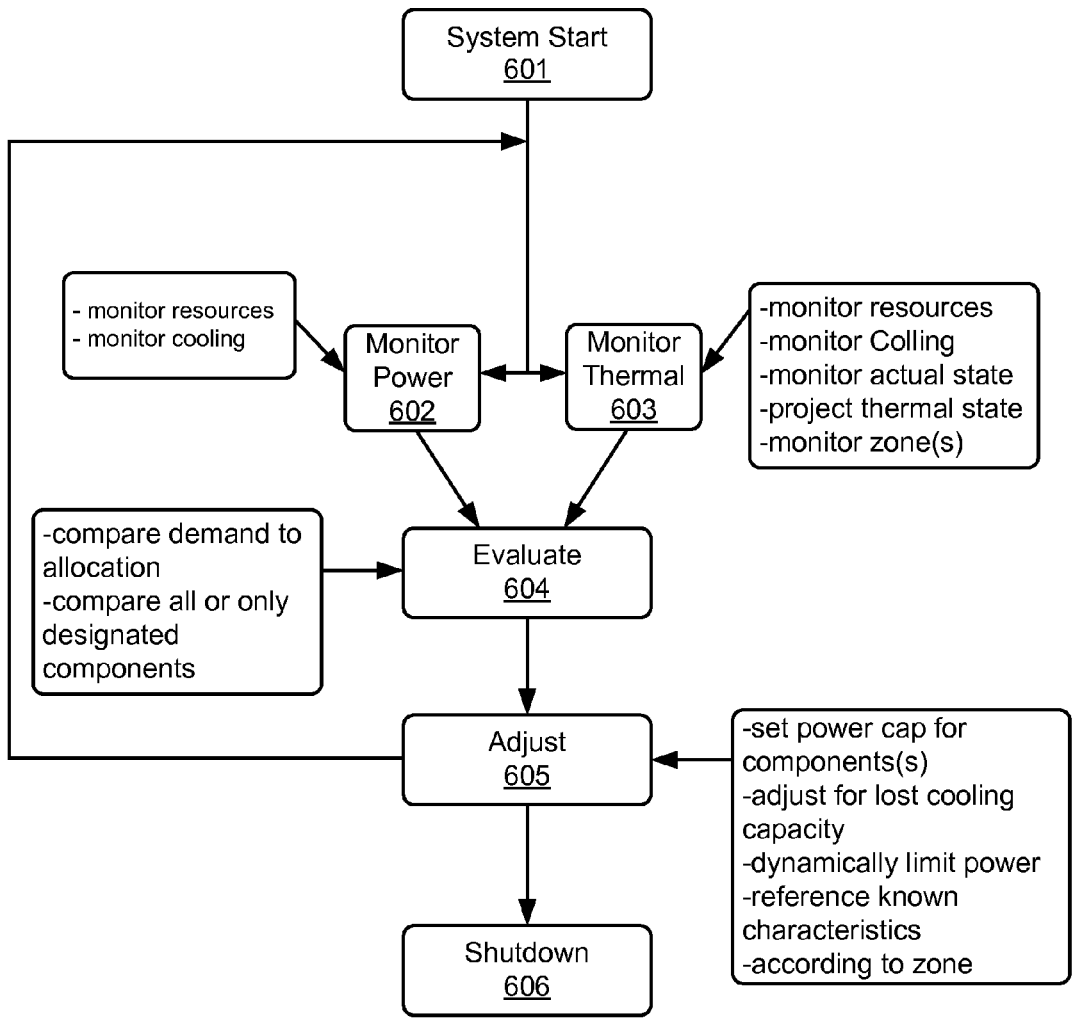
FIG. 6 is a flow chart depicting a method of collaborative power and thermal control of fan run time average power limiting.

Referring to FIG. 6, an exemplary method for fan run time average power limiting (fan RAPL) 600 is shown. The exemplary method for fan RAPL 600 commences at system startup 601. Upon system startup 601, the information handling system commences monitoring power 602 and monitoring thermal states 603. Generally, monitoring power 602 and monitoring thermal states 603 occur substantially simultaneously. However, the monitoring power 602 and monitoring thermal states 603 steps need not occur simultaneously, and may merely occur on a temporal basis that provides for adequate correlation and control of power and thermal states as judged by a system user, designer, manufacturer or other similarly interested party.

Equipped with power state information and thermal state information, the system performs an evaluation 604. Evaluation 604 generally calls for comparing power consumption of the various computing resources as well as system cooling (collectively referred to as "components of the IHS") with at least one of the actual thermal load and projected generation of thermal load. Generally, evaluation 604 includes comparison of the power consumption, thermal load (real and/or projected), and desired system performance characteristics.

Subsequently, the system performs adjustment 605. Adjustment 605 accounts for at least one of the prevailing power and cooling demands and the projected power and cooling demands, and rebalances power allocation within the system. Adjustment 605 may be performed, for example, according to performance characterizations such as the graph provided in FIG. 2.

The method for fan RAPL 600 continues unabated until system shutdown 606.

In the exemplary method for fan RAPL 600, power allocation may be performed in a variety of ways including any of the ways discussed above, as well as by applying a variety of other techniques is may be realized by one skilled in the art.

Thus, the teachings herein provide a collaborative solution that provides dynamic run-time bi-directional communication. The solution serves the needs of both power control and thermal control where priority between them may fluctuate.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method for allocating power within an information handling system (IHS), the method comprising:
   monitoring power consumed by components within the IHS;

monitoring thermal state of the components;
evaluating power demand and cooling demand for each of the components; and
adjusting power allocated to at least one of a computing resource and system cooling according to results of the evaluating, wherein the adjusting comprises setting a power cap for at least one of the computing resource and the system cooling and dynamically limiting an amount of power being sent to at least one component.

2. The computer-implemented method as in claim 1, wherein the adjusting comprises implementing subsystem-level power capping to compensate for lost cooling capacity.

3. The computer-implemented method as in claim 1, wherein monitoring the thermal state comprises monitoring one of an actual thermal state and a projected thermal state.

4. The computer-implemented method as in claim 1, wherein adjusting power to the system cooling is implemented in response to a thermal state of the at least one computing resource.

5. The computer-implemented method as in claim 1, wherein the adjusting is performed according to a performance characterization.

6. The computer-implemented method as in claim 1, wherein the evaluating is applied to only components that provide a greatest constrain on power allocated to the system cooling.

7. The computer-implemented method as in claim 1, wherein the cooling system comprises a plurality of zones and the adjusting is performed individually for each zone.

8. An information handling system (IHS) comprising:
a plurality of computing resources configured for providing computing functions;
system cooling configured for cooling the plurality of computing resources; and
a controller that is configurable to monitor power consumed by the computing resources and the system cooling and to monitor the thermal state of the computing resources; to evaluate power demand and cooling demand for each of the components; and to adjust power allocated to at least one of a computing resource and system cooling according to results of the evaluating, wherein to adjust the power allocated, the controller sets a power cap for at least one of the computing resource and the system cooling and dynamically limits an amount of power being sent to at least one component.

9. The information handling system (IHS) as in claim 8, wherein the plurality of computing resources comprises at least one of one or more processors, memory, storage, an input/output controller, a baseboard management controller (BMC), and a sensor.

10. The information handling system (IHS) as in claim 8, wherein the system cooling comprises at least one fan.

11. The information handling system (IHS) as in claim 8, wherein the controller comprises a node manager.

12. The information handling system (IHS) as in claim 8, wherein the controller is configured to adjust the power by pulse width modulation (PWM).

13. The information handling system (IHS) as in claim 8, wherein at least one of the monitoring power, monitoring the thermal state and the adjusting is performed by implementing a messaging protocol.

14. The information handling system (IHS) as in claim 13, wherein the messaging protocol comprises one of Intelligent Platform Management Interface (IPMI) and Datacenter Manageability Interface (DCMI).

15. The information handling system (IHS) as in claim 13, wherein the messaging protocol comprises a command for at least one of: obtaining a power range for the cooling system; obtaining a rate of change for the cooling system; obtaining power allocated to the cooling system; setting a power limit for the cooling system; obtaining a performance limit for the cooling system; and receiving notification of a change in a power range for the cooling system.

16. A controller for an information handling system (IHS), the controller comprising:
a processing unit and a set of machine executable instructions stored on non-transitory machine readable media and configured to be executed by the processing unit, the instruction for configuring the controller to:
monitor power consumed by at least one computing resource and system cooling;
monitor the thermal state of the at least one computing resource;
evaluate power demand for the at least one computing resource and the system cooling as well as cooling demand for the at least one computing resource; and
adjust power allocated to at least one of the at least one computing resource and to the system cooling according to results of the evaluating:
wherein to adjust the power allocated, the controller: sets a power cap for at least one of the computing resource and the system cooling; and dynamically limits an amount of power being sent to at least one component.

17. The controller for an information handling system (IHS) as in claim 16, wherein the non-transitory machine: readable media comprises at least one of software and firmware.

18. The controller for an information handling system (IHS) as in claim 16, comprising a microprocessor.

* * * * *